June 12, 1934.  B. B. BALKEMA ET AL  1,962,127
PARKING DOLLY
Filed Sept. 21, 1931  5 Sheets-Sheet 1
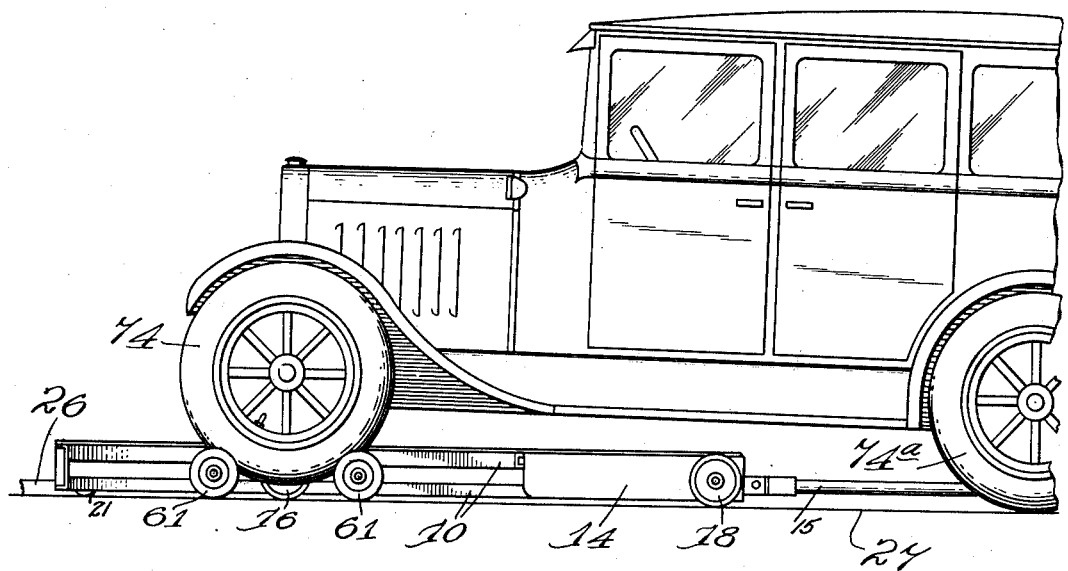
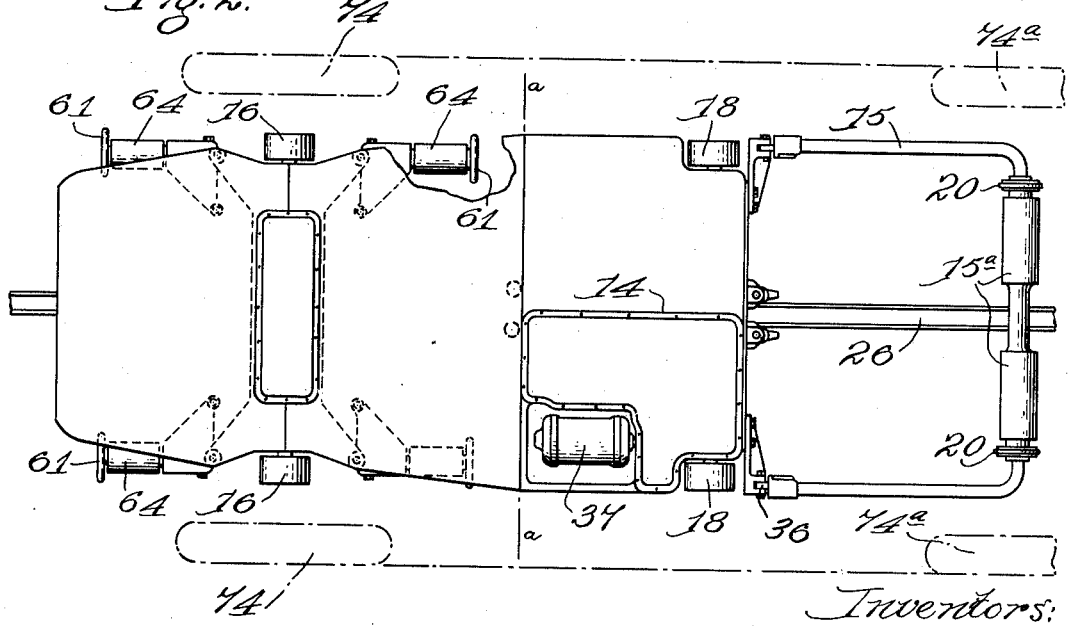

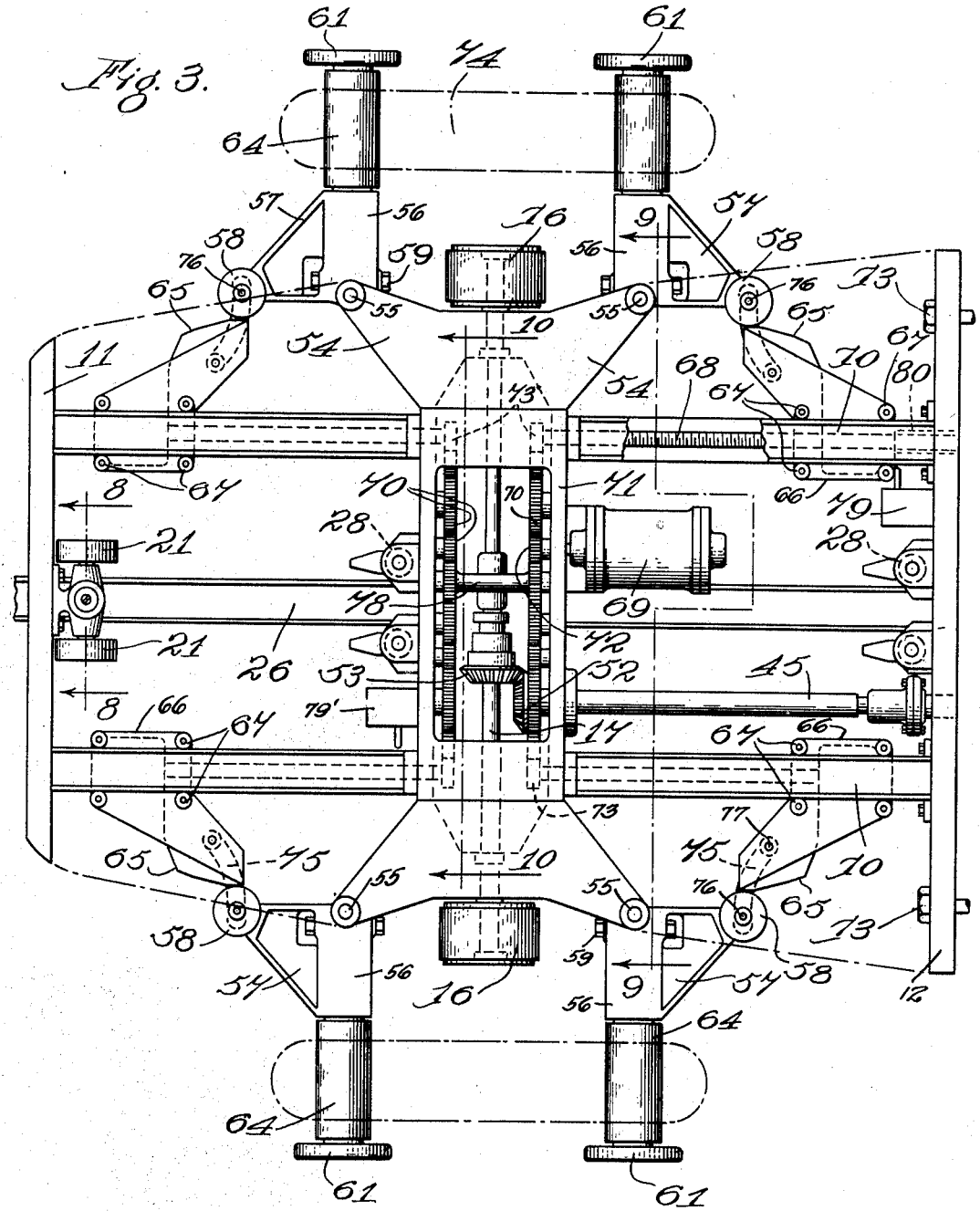

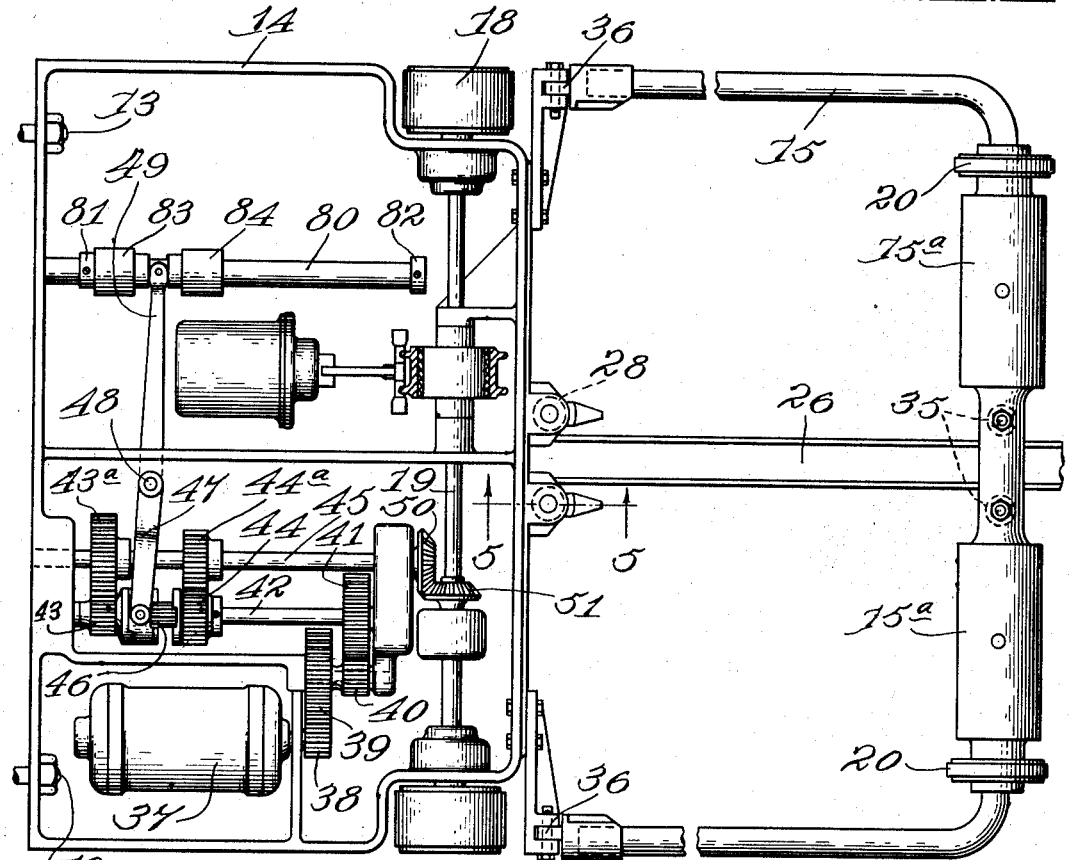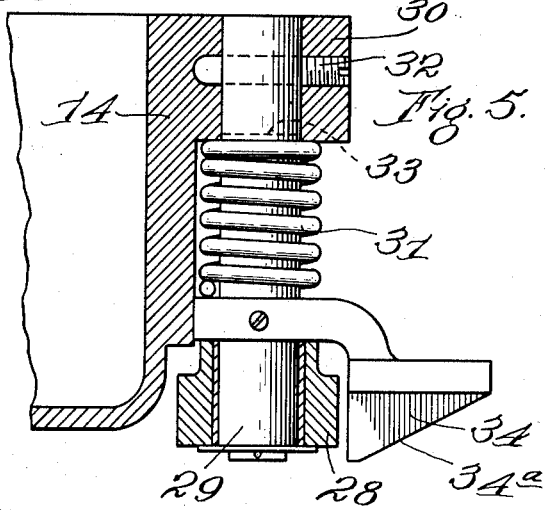

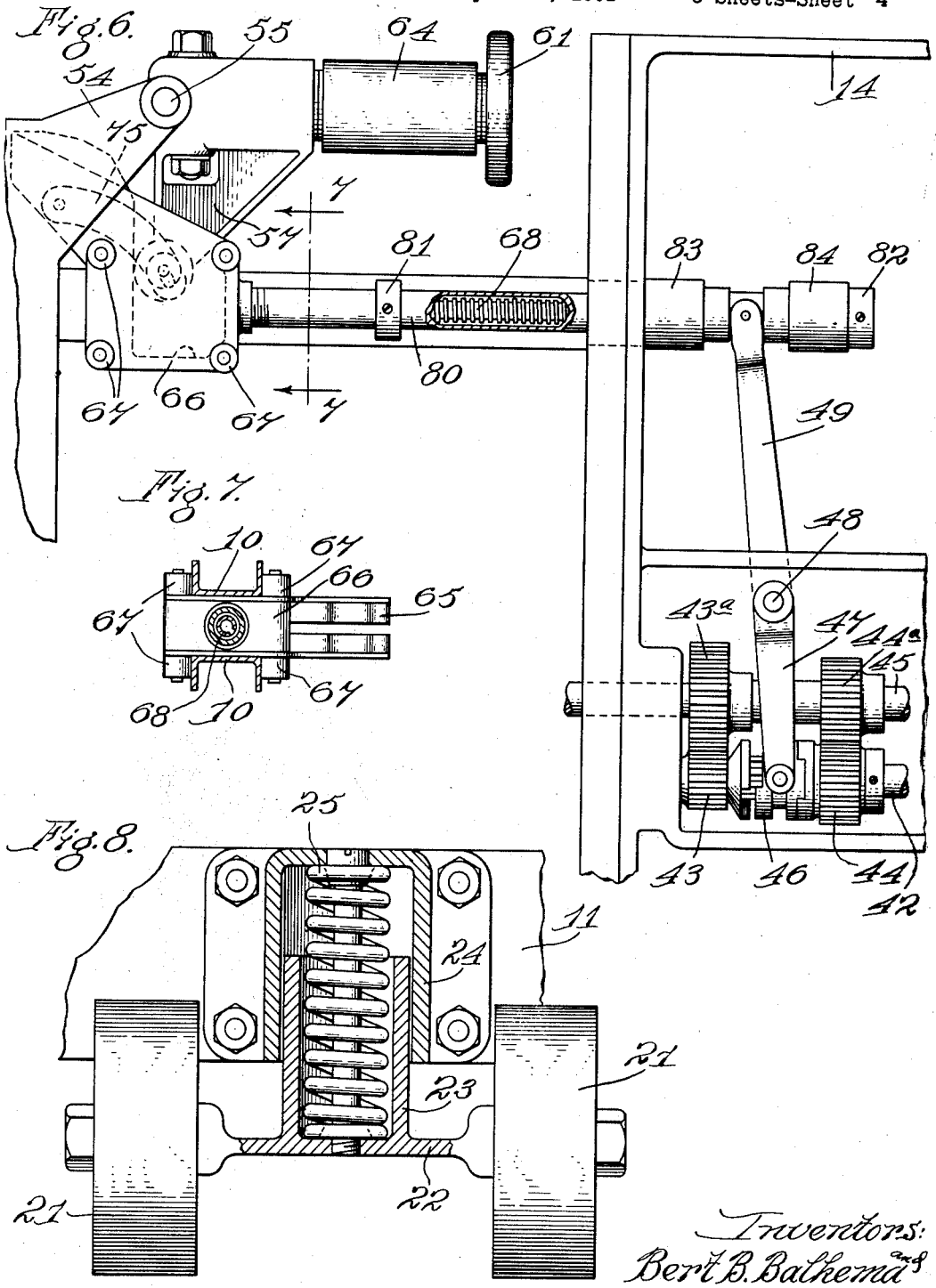

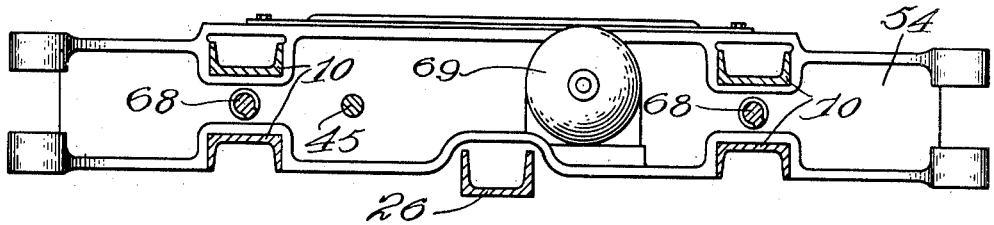
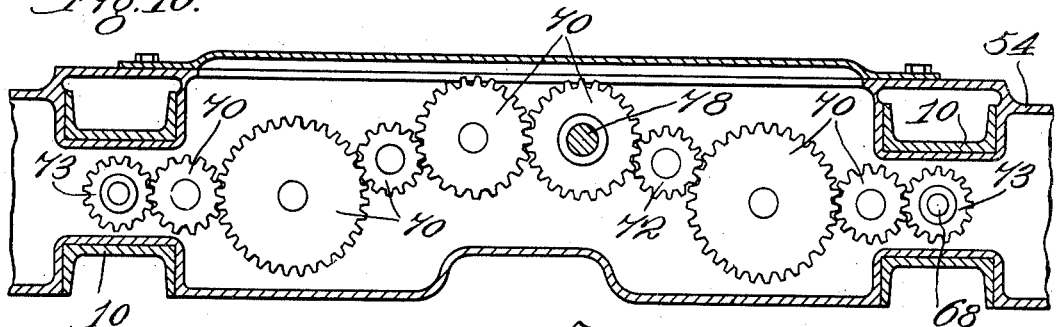
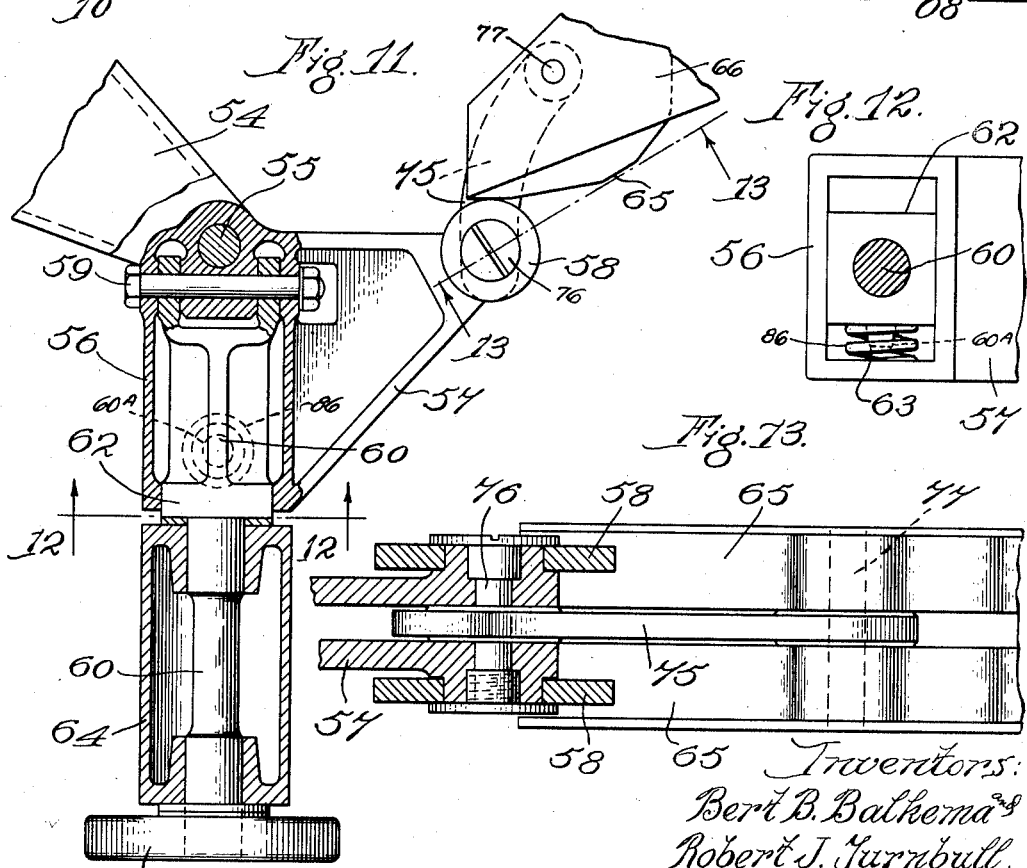

Patented June 12, 1934

1,962,127

UNITED STATES PATENT OFFICE 1,962,127

PARKING DOLLY

Bert B. Balkema and Robert J. Turnbull, Chicago, Ill., assignors, by mesne assignments, to Mechanical Parking Patents, Inc., Chicago, Ill., a corporation of Illinois Application September 21, 1931, Serial No. 564,182

19 Claims. (Cl. 254—7)

This invention relates to improvements in vehicle handling apparatus and, more especially, such apparatus which is particularly adapted for use in moving vehicles in parking garages.

Among the objects or features of our invention is the provision of a carriage or dolly adapted to be run longitudinally under a vehicle to be moved; and provided with members adapted to be extended or moved to engage the wheels of a vehicle or retracted to clear said wheels when the carriage or dolly is moved into or out of position under the vehicle. The dolly is mounted on suitable traction members which are provided with means for propelling the same.

Another feature of the invention is the provision of vehicle wheel-engaging means on the dolly comprising a pair of swingable arms on each side, said arms adapted to engage the wheels (preferably the front) of a vehicle and lift the same from the floor. The vehicle to be moved is towed by the dolly in this position.

Another feature of the invention is the provision of a two-speed gear transmission on the dolly with automatic means for shifting the same so that when the dolly is running freely, the propelling mechanism will operate at high speed and when it is towing a vehicle, the propelling mechanism will operate at slow speed.

Another object or feature is the provision of shock-absorbing means on the dolly assisting the same in running over uneven floors or surfaces. This is of especial value in cases where the dolly must operate to and from elevators. In such cases, when the elevator is not in exact registry with the floor, difficulty has been encountered in moving the dolly. This difficulty is eliminated or lessened by our improved shock-absorbing means which permit the dolly to travel over such uneven floors or surfaces.

Another object or feature of our invention is the provision of a single centrally arranged relatively low rail or similar member fastened on the floor and adapted to co-operate with suitable rollers on the dolly. This provision serves to keep the dolly in its proper path; and we prefer to provide no rails or other guiding means for the vehicle wheels. The floor upon which the vehicles are stored may thus be kept relatively free from high rails or other guiding means for the vehicle wheels. The centrally arranged guides for the dolly are low enough so that a vehicle may ordinarily be driven over the same crosswise if desired. It is contemplated that if a vehicle is towed by its front wheels in an elevated position and the dolly kept in its proper path, the vehicle will follow in a proper path. If necessary or desirable, however, we may extend the dolly a sufficient length, or provide it with an extension, to assist in guiding the back wheels of the vehicle in line with the front wheels as the vehicle is towed.

Other objects or features and advantages of our invention will appear more fully as we proceed with our specification.

In the present form of apparatus or device embodying the features of our invention shown in the accompanying drawings—

Figure 1 is a view in side elevation showing the apparatus towing a motor-vehicle; Fig. 2 is a top plan view of the apparatus but with the vehicle wheel-engaging means in retracted position; Figs. 3 and 4 constitute a top plan view of the dolly on an enlarged scale with the cover plates removed, the division between Figs. 3 and 4 being indicated by the dotted line A—A in Fig. 2; Fig. 5 is a view taken as indicated by the line 5—5 of Fig. 4; Fig. 6 is an enlarged top plan view showing the speed-changing mechanism and one of the wheel-engaging members; Fig. 7 is a sectional view taken as indicated by the line 7—7 of Fig. 6; Fig. 8 is a sectional view taken as indicated by the line 8—8 of Fig. 3; Fig. 9 is a sectional view taken as indicated by the line 9—9 of Fig. 3; Fig. 10 is a sectional view taken as indicated by the line 10—10 of Fig. 3; Fig. 11 is an enlarged horizontal sectional view showing the construction of one of the wheel-engaging members; Fig. 12 is a sectional view taken as indicated by the line 12—12 of Fig. 11; and Fig. 13 is a sectional view taken as indicated by the line 13—13 of Fig. 11.

As shown in the drawings, the dolly includes a carriage or chassis mounted on traction members, means for propelling the carriage, and a pair of wheel-engaging arms on each side of the carriage adapted to be extended or moved to engage the front wheels of a vehicle or retracted to clear said wheels to permit the dolly to be moved or run longitudinally under a vehicle. The carriage or chassis includes a substantially rectangular rigid frame formed of a pair of longitudinally arranged spaced channel members 10, 10 on each side, said channel members being joined at their forward ends by a cross bar 11 and at their rear ends by a cross bar 12. For convenience, the end of the dolly adapted to support the wheels of a vehicle (preferably the front wheels), as shown in Fig. 1, will be referred to as the forward end of the dolly and the other end as the rear end; although it is to be understood that the dolly is capable of moving and towing a vehicle in either direction, with either the front or rear wheels of the vehicle engaged by the wheel-engaging members, and with the vehicle faced in either direction with respect to the dolly. In normal practice, it will be assumed, however, that the vehicle will be engaged by the dolly as shown in Fig. 1, in which position it is adapted to be moved in either direction. To the rear of the cross bar 12 and bolted to the same by the bolts 13 is a substantially rectangular-shaped casting 14. Pivotally attached to the rear end of the casting 14 is an extension 15. The substantially rectangular frame including the longitudinal members 10, cross bars 11 and 12, casting 14 and extension 15, together form a substantially rectangular frame somewhat narrowed in front which may be considered as a chassis or carriage.

The chassis or carriage above referred to is mounted on traction members, here shown as the forward driving wheels 16 mounted on the transverse shaft 17 and the rear driving wheels 18 are mounted on the transverse shaft 19. The rear end of the hinged or pivoted extension 15 is supported by the wheels 20. Numerals 21, 21 indicate a pair of spring-mounted or shock-absorbing wheels at the forward end of the carriage. The detail of the mounting of these wheels is shown in Fig. 8. It will be seen that these wheels are supported on a transverse shaft 22 having a centrally arranged upwardly extending cylindrical member 23 telescoping in a suitable socket 24 mounted on the cross member 11. A spiral spring 25 is housed in the telescoping members 23 and 24, said spring yieldingly pressing the wheels 21, 21 downwardly. The flexible mounting of these wheels will assist in permitting the dolly to run over unevennesses, for example, from an elevator to an adjacent floor and vice versa, when the surfaces are not in exact registry.

Means are provided for guiding the dolly in its desired path. Said means include a relatively low channel member 26 mounted on the floor 27 and four pairs of guide wheels carried by the dolly. These guide wheels (with the exception of the two guide wheels on the extension) are indicated by 28 and the details of the same are shown in Fig. 5. As here shown, the wheel 28 is rotatably mounted on a vertical shaft 29, the latter being vertically movable in the support 30. Numeral 31 indicates a spiral spring on the shaft 29 arranged above the roller which yieldingly urges the roller and shaft downwardly. The vertical movement of the shaft 29 is limited in the support 30 by a pin 32 passing through a vertical slot in the upper end shaft 29. The bottom of this slot is indicated by numeral 33 and it extends upwardly to the upper end of the shaft. The lower end of the shaft 29 has pinned to it a guard or shoe 34 located in front (or back) of the guide wheel 28. The lower surface of the shoe 34 is beveled, as indicated by 34$^a$, to enable it to ride up over projections or unevennesses that it might encounter. When the shoe engages any projection that might otherwise injure the guide wheel 28, said shoe rides up over the projection lifting the wheel out of the way. The guide wheels on the extension 15 are indicated by 35 and are similar to those just described, except that the shafts upon which they are mounted are not vertically movable and the projecting shoes 34 are dispensed with. These are not necessary in view of the fact that the extension 15 is pivotally supported to the casting 14 by the horizontal pivots 36, 36. The centers of the guide rollers 35 on the extension are directly below the projected axes of the wheels 20. The guide wheels 35 are high enough and the wheels 20 are large enough so that the wheels 20 will lift the guide wheels and protect the same when the dolly moves from a lower surface to a higher surface over a bump.

We shall now describe the propelling mechanism. This includes a driving motor 37 mounted in the casting 14. This motor, through the gears 38, 39, 40 and 41, drives the shaft 42 which is provided with a low speed gear 43 and a high speed gear 44 meshing with complementary gears 43$^a$ and 44$^a$, respectively, on the drive shaft 45. The gears 43 and 44 are loosely mounted on the shaft 42. Numeral 46 indicates a clutch member which is slidably mounted on and keyed to shaft 42, so that it is rotatable with the shaft 42. The clutch member is adapted to be shifted by the forked end 47 of the shifting lever 49 so that the member 46 will engage and lock with either of the gears 43 or 44 to give a slow or high speed, respectively, to the driving shaft 45. The shifting lever 49 is pivotally mounted at 48 and its outer end is adapted to be moved to cause the clutch member 46 to engage either the low or the high speed gear. This shifting is automatically accomplished by movement of the wheel-engaging members. That is, when the wheel-engaging members are retracted, the high speed gear 42 is engaged. When the wheel-engaging members are extended to engage the wheels of a vehicle to be towed, the low speed 43 is in gear. The details of this will be described hereinafter.

Rotation of the drive shaft 45 is transmitted to the rear driving wheel shaft or axle 19 through the bevel gears 50 and 51, and to the forward driving wheel shaft or axle 17 through the bevel gears 52 and 53.

We shall now describe the construction and operation of the vehicle wheel-engaging members. These members include a pair of swingable arms on each side of the carriage. Since the construction and operation of these is the same, we shall describe in detail but one pair. Each side of the carriage is provided with a pair of arms 54. Each of these arms 54 carries a vertical pivot 55 on which is pivotally mounted a socket member 56 provided with a lateral bifurcated extension or bracket 57 carrying a pair of cam rollers 58. The socket member 56 at its inner end carries a horizontal pivot 59 having pivotally mounted thereon the arm 60. The outer end of this arm carries the supporting wheel 61. At the point where this arm emerges from the socket member 56, the same is squared, as indicated by 62, said squared portion being vertically movable in the rectangular opening 63 in the end of the socket member 56. Between the wheel 61 and the squared portion 62, the arm 60 carries the anti-friction wheel or roller 64 rotatably mounted thereon. This roller is adapted to engage the tire of a vehicle wheel.

The arms 60 are adapted to be extended at right angles to the carriage to engage the wheels of a vehicle, as shown in Figs. 1 and 3, or retracted to lie close to the sides of the carriage, as shown in Fig. 2. When in this retracted position, the carriage can be run longitudinally into or out of position beneath a vehicle to be moved, said carriage being built low enough to permit this. In order to extend or retract the arms 60, movable cams 65 are provided and adapted to engage the cam rollers 58. The construction and operation of these cams are substantially the same and, consequently, we shall describe in detail but one.

Before describing these cams 65, it may be noted that the arms 60 are provided with coil springs 86 interposed between the underside of the arms 60 and socket members 56 to normally retain the arms 60 with their wheels 61 off the floor during the movement of the carriage with such arms in retracted position.

Each cam includes a pair of cam surfaces 65 upon which the cam rollers 58, 58 ride. These cam surfaces are mounted on a slidable block 66 traveling between the channels 10, 10 and carrying guide wheels 67 bearing against the flanges of the channels. (See Fig. 7.) Each block 66 is threaded to be moved longitudinally by a screw 68. These screws are operated by a motor 69 through trains of gears (indicated, in general, by 70) in the gear box 71. Rotation of the gear 72 on the motor shaft is transmitted through the gear trains 70, 70 to the gears 73 on the ends of the screw shafts 68. The motor 69 is reversible so that the blocks 66 may be moved in either direction. That is, the two blocks on each side of the carriage may be drawn toward each other to retract the rollers 64 into the position shown in Fig. 2 or separated to swing the arms 60 (with the rollers 64 thereon) outwardly toward each other to engage the underside of a vehicle wheel 74 and lift the same from the floor or other support 27, as shown in Figs. 1 and 3. Numeral 75 indicates a link connecting the pin 76 (supporting the cam rollers 58) and a pin 77 carried by the block 66 in order to retract the arms 60 when the blocks 66 are moved toward each other. The pin 76 is loosely mounted in the outer end of the link 75 in order to give sufficient flexibility and lost motion to permit proper operation of the cam rollers 58 on the cam surfaces 65 in swinging the arms 60. The gear trains 70, 70 on the two sides of the gear box 71 are connected by a cross shaft 78 which connects two opposite gears in said trains.

Numerals 79 and 79' may indicate limit switches to control respectively the extended and retracted positions of the arms 60.

We will now describe the means by which movement of the wheel-engaging members changes the driving gear. One of the blocks 66 (see Figs. 3, 4, 6 and 7) is provided with a tubular extension 80 having thereon two collars 81 and 82. The outer end of the gear shift lever 49 is forked and mounted between two collars 83 and 84 slidably mounted on the tube 80 and lying between the collars 81 and 82. When the block 66 is moved to the limit of its travel to the right, as viewed in Fig. 3, the collar 81 engages the collar 83 to throw in the low gear, as shown in Fig. 4. Reverse movement of the block causes the collar 82 to engage the collar 84 to throw in the high gear, as shown in Fig. 6. The tube 80 being hollow permits the end of the screw 68 to enter the same when the block is moved to the left.

As here shown, the extension 15 is tubular in construction and pivotally attached to the lower end of the carriage by the horizontal pivots 36. This extension is of sufficient length and width so that it will lie between and close to the rear wheels 74ᵃ of a vehicle when the front wheels are supported on the wheel-engaging members 64, 64. It is contemplated that this extension 15 will assist in keeping the rear wheels 74ᵃ of the vehicle in the proper path when the vehicle is being towed. If these wheels should move from side to side, they will engage the side portions of the tubular extension 15 and be held in the proper path. The rear end of the extension 15 is provided with cylindrical casings 15ᵃ adapted to act as weights, if necessary, in order to hold the extension down and offset any tendency that there might be for the wheels 74ᵃ to lift the same when they engage it.

While we have shown and described certain embodiments of our invention, it is to be understood that it is capable of many modifications. Changes, therefore, in the construction and arrangement may be made without departing from the spirit and scope of the invention as disclosed in the appended claims, in which it is our intention to claim all novelty inherent in the invention, as broadly as permissible, in view of the prior art.

What we regard as new, and desire to secure by Letters Patent, is:

1. A parking dolly, including; a low carriage mounted on traction members and adapted to be run longitudinally under a vehicle to be moved; means for propelling the carriage; a pair of arms mounted on each side of the carriage, said arms being adapted to be swung outwardly in substantially a horizontal plane toward each other to engage the underside of a wheel of a vehicle over said dolly and lift the same from the ground or swung inwardly away from each other alongside the carriage to clear said wheel; supporting wheels on the outer ends of said arms; brackets carried by said arms; cam rollers on said brackets; movable cams on the carriage adapted to engage said cam rollers to swing said arms; and means for moving said cams.

2. Apparatus for handling vehicles, including; a carriage mounted on traction members and adapted to be run longitudinally under a vehicle to be moved; means for propelling the carriage; members on said carriage adapted to be extended to engage the wheels of a vehicle over said carriage or retracted to clear said wheels; arms for said wheel-engaging members pivotally mounted on the carriage by universal connections, wheels on the outer ends of said arms adapted to support the same upon the floor on which the apparatus travels, and means for moving said arms and wheel-engaging members.

3. Apparatus for handling vehicles, including; a carriage mounted on traction members and adapted to be run longitudinally under a vehicle to be moved; means for propelling the carriage; members on said carriage adapted to be extended to engage the wheels of a vehicle over said carriage or retracted to clear said wheels; arms for said wheel-engaging members pivotally mounted on the carriage by universal connections, wheels on the outer ends of said arms adapted to support the same upon the floor on which the apparatus travels, said arms being adapted to be swung substantially in a horizontal plane toward each other when extended to engage the underside of a vehicle wheel, and means for moving said arms and wheel-engaging members.

4. Apparatus for handling vehicles, including; a carriage mounted on traction members and adapted to be run longitudinally under a vehicle to be moved; means for propelling the carriage; members on said carriage adapted to be extended to engage the wheels of a vehicle over said carriage or retracted to clear said wheels; arms for said wheel-engaging members pivotally mounted on the carriage by universal connections, wheels on the outer ends of said arms adapted to support same upon the floor on which the apparatus travels, said arms being adapted to be swung substantially in a horizontal plane toward each other when extended to engage the underside of a vehicle wheel and lift the same from the ground, and means for moving said arms and wheel-engaging members.

5. Apparatus for handling vehicles, including: a carriage mounted on traction members and adapted to be run longitudinally under a vehicle to be moved; means for propelling the carriage; members on said carriage adapted to be extended to engage the wheels of a vehicle over said carriage or retracted to clear said wheels, means for moving said wheel-engaging members, said means for propelling the carriage including a clutch and a two-speed gear instrumentality, said clutch being operated by movement of the wheel-engaging means.

6. Apparatus for handling vehicles, including: a carriage mounted on traction members and adapted to be run longitudinally under a vehicle to be moved; means for propelling the carriage; members on said carriage adapted to be extended to engage the wheels of a vehicle over said carriage or retracted to clear said wheels; means for moving said wheel-engaging members, an arm swingably mounted on the carriage, and a slidably mounted guided block for swinging said arm, said arm and block being provided with a co-operating cam and roller.

7. Apparatus for handling vehicles, including: a carriage mounted on traction members and adapted to be run longitudinally under a vehicle to be moved; means for propelling the carriage; members on said carriage adapted to be extended to engage the wheels of a vehicle over said carriage or retracted to clear said wheels; means for moving said wheel-engaging members; and an extension on said carriage of sufficient width to lie between and close to the rear wheels of a vehicle when the front wheels are engaged by the wheel-engaging members.

8. Apparatus for handling vehicles, including: a carriage mounted on traction members and adapted to be run longitudinally under a vehicle to be moved; means for propelling the carriage; members on said carriage adapted to be extended to engage the wheels of a vehicle over said carriage or retracted to clear said wheels; and means for moving said wheel-engaging members, an extension hingedly attached to one end of the carriage, said extension being long enough and of sufficient width to lie between and close to the rear wheels of a vehicle when the front wheels are engaged by the wheel-engaging members.

9. Apparatus for handling vehicles, including: a carriage mounted on traction members and adapted to be run longitudinally under a vehicle to be moved; means for propelling the carriage; means on said carriage adapted to be extended to engage the wheels of a vehicle over said carriage or retracted to clear said wheels; wheels on the outer ends of said wheel-engaging means adapted to support the same upon the floor on which the apparatus travels; means for moving said wheel-engaging means; and means for normally retaining said wheel-engaging means and said wheels therefor out of contact with said floor when said wheel-engaging means is retracted.

10. Apparatus for handling vehicles, including: a carriage mounted on traction members and adapted to be run longitudinally under a vehicle to be moved; means for propelling the carriage; members on said carriage adapted to be extended to engage the wheels of a vehicle over said carriage or retracted to clear said wheels; arms for said wheel-engaging members pivotally mounted on the carriage; wheels on the outer ends of said arms adapted to support the same upon the floor on which the apparatus travels; said arms being adapted to be swung substantially in a horizontal plane toward each other when extended to engage the underside of a vehicle wheel; and means for moving said arms and wheel-engaging members.

11. Apparatus for handling vehicles, including: a carriage mounted on traction members and adapted to be run longitudinally under a vehicle to be moved; means for propelling the carriage; members on said carriage adapted to be extended to engage the wheels of a vehicle over said carriage or retracted to clear said wheels; means for moving said wheel-engaging members; an extension on said carriage of sufficient width to lie between and close to the rear wheels of a vehicle when the front wheels are engaged by the wheel-engaging members; a guide rail; and means on said carriage and on said extension adapted to cooperate with said rail to guide said apparatus.

12. Apparatus for handling vehicles, including: a carrier mounted on traction members and adapted to be run longitudinally under a vehicle to be moved; means on said carrier adapted to lift one end of the vehicle so that the vehicle is adapted to be towed on the wheels at its opposite end; means for moving said carrier; an extension on said carrier adapted to guide the wheels of the vehicle at the unlifted end; and guiding means for said carrier.

13. Apparatus for handling vehicles, including: a carrier mounted on traction members and adapted to be run longitudinally under a vehicle to be moved; means on said carrier adapted to lift one end of the vehicle so that the vehicle is adapted to be towed on the wheels at its opposite end; means for moving said carrier; an extension on said carrier adapted to guide the wheels of the vehicle at the unlifted end; a single guide member; and means on said carrier cooperating with said guide member to guide said carrier.

14. Apparatus for handling vehicles, including a carriage mounted on traction members; power-driven means for propelling said carriage; members on said carriage adapted to be extended to engage the wheels of a vehicle or retracted to clear said wheels; means for moving said wheel-engaging members; said power-driven means for propelling said carriage including a variable speed mechanism operable to propel the carriage with either high or low speed in response to relative positions of the wheel-engaging means.

15. Apparatus for handling vehicles, including: a carrier mounted on traction members and adapted to be run under a vehicle to be moved; means on said carrier adapted to lift one end of the vehicle so that the vehicle is adapted to be towed on the wheels at its opposite end; means for moving said carrier; an extension on said carrier adapted to guide the wheels of the vehicle at the uplifted end; and guiding means for said carrier; said means for moving said carrier including variable speed control means operable to propel the carrier with different speeds in response to variable positions of said vehicle lifting means.

16. Apparatus for handling vehicles, including: a carrier mounted on traction members and adapted to be run under a vehicle to be moved; means on said carrier adapted to lift one end of the vehicle so that the vehicle is adapted to be towed on the wheels at its opposite end; means for moving said carrier; an extension on said carrier adapted to guide the wheels of the vehicle at the unlifted end; a single guide member; and means on said carrier cooperating with said guide member to guide said carrier; said means for moving said carrier including variable speed control means operable to propel the carrier with different speeds in response to variable positions of said vehicle lifting means.

17. Apparatus for handling vehicles, including: a parking car having a body frame mounted on traction members and adapted to be run under a vehicle to be moved; means on said body frame adapted to engage the vehicle; means for moving said body frame with the engaged vehicle; an extension on said body frame adapted to guide a pair of freely rolling wheels of said vehicle while it is being moved; and guiding means for said body frame.

18. Apparatus for handling vehicles, including: a parking car having a body frame mounted on traction members and adapted to be run under a vehicle to be moved; means on said body frame adapted to engage the vehicle; means for moving said body frame with the engaged vehicle; said body frame having an extension adapted to guide a plurality of freely rolling wheels of the vehicle while it is being moved; a single guide member; and means on said parking car cooperating with said guide member for guiding said parking car.

19. Apparatus for handling vehicles as embodied in claim 17, and including a variable speed mechanism cooperating with said body frame moving means and automatically operable for propelling said body frame with one speed when the parking car is propelled disengaged from the vehicle and with another speed when the parking car is propelling an engaged vehicle.

BERT B. BALKEMA.
ROBERT J. TURNBULL.